United States Patent [19]

Uchida

[11] Patent Number: 4,656,723
[45] Date of Patent: Apr. 14, 1987

[54] METHOD OF FORMING SCREW THREAD ON CRANKSHAFT AND THE LIKE

[75] Inventor: Teruo Uchida, Fuchu, Japan

[73] Assignee: Kioritz Corporation, Tokyo, Japan

[21] Appl. No.: 739,329

[22] Filed: May 30, 1985

[30] Foreign Application Priority Data

Jun. 11, 1984 [JP] Japan .................. 59-119563

[51] Int. Cl.$^4$ .......................................... B23P 13/04
[52] U.S. Cl. ......................................... 29/558; 29/6; 29/156.4 R; 148/16.5
[58] Field of Search .............. 29/558, 156.4 R, 6, 29/557, 156.5 A, 156.7 R, 159, 159.2; 148/16.5; 82/9, 1 C, 5; 74/598, 595; 51/323, 326, 322

[56] References Cited

U.S. PATENT DOCUMENTS

| | | | |
|---|---|---|---|
| 3,377,214 | 4/1968 | Woodbridge et al. | 74/595 X |
| 3,590,469 | 7/1971 | Rohs | 29/558 |
| 3,851,361 | 12/1974 | Bowen, III | 74/598 X |
| 4,204,437 | 5/1980 | Espana | 148/16.5 X |
| 4,279,528 | 7/1981 | Mangiavacchi et al. | 148/16.5 X |
| 4,415,378 | 11/1983 | McKinney et al. | 148/16.5 X |
| 4,519,125 | 5/1985 | Colonivs et al. | 29/558 |

OTHER PUBLICATIONS

ASM Metals Handbook, vol. 2, Eigth Edition, 1964, pp. 110-111.

Primary Examiner—Gil Weidenfeld
Assistant Examiner—Glenn L. Webb
Attorney, Agent, or Firm—Browdy and Neimark

[57] ABSTRACT

A method of forming a screw thread on one portion of a crankshaft and the like wherein the one portion of the shaft is worked on to provide thereto a diameter of a value greater than the value of the diameter of the one portion of the shaft before it is subjected to roll threading plus the value of the thickness of a hard, thin surface layer expected to be formed by carburizing on the whole of the shaft. Then, carburizing is performed to form the hard, thin surface layer on the whole of the shaft. Thereafter, the one portion of the shaft is subjected to grinding or machining to remove the hard, thin surface layer therefrom to reduce the diameter of the one portion of the shaft to a level conforming to the diameter thereof before roll threading is performed on the one portion of the shaft, and roll threading is performed on the one portion of the shaft from which the hard, thin surface layer is removed, to provide the shaft with a threaded portion.

1 Claim, 1 Drawing Figure

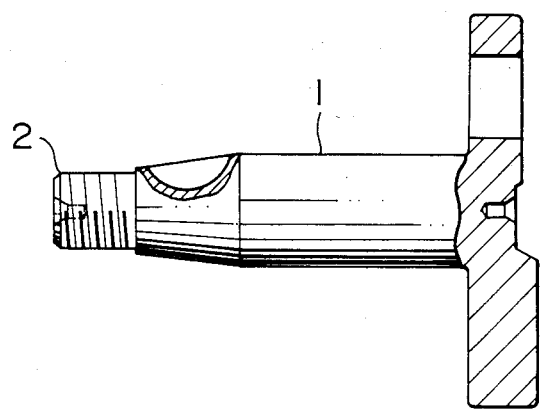

METHOD OF FORMING SCREW THREAD ON CRANKSHAFT AND THE LIKE

BACKGROUND OF THE INVENTION

This invention relates to methods of forming a screw thread on a crankshaft and the like, and more particularly it deals with a method of performing roll threading on a portion of a crankshaft and the like which is subjected to case hardening.

To produce a crankshaft for use with a small engine, for example, it is necessary to subject the material for producing the crankshaft to case hardening. When the operation of forming a screw thread on the crankshaft is performed, it has hitherto been usual practice to use one of the following two methods. One method consists in first forming a screw thread on one portion of the crankshaft either by machining or by roll threading before carburizing is performed, and then performing carburizing on other portions of the crankshaft than the threaded portion which is prevented from being subjected to carburizing, and the other method comprises the steps of subjecting the whole body of the crankshaft to carburizing after a screw thread is formed beforehand, and tempering only the threaded portion by suitable means.

These methods of the prior art have suffered the disadvantage, particularly when roll threading is relied on for forming a screw thread, that the screw thread formed fails to meet the required standards of precision because of inner stresses developed in the threaded portion of the crankshaft, as a result of the carburizing being performed following the roll threading. To ensure that the screw thread formed meets the required standards of precision, it is necessary to provide another process step, thereby rendering the operation troublesome and time-consuming. In addition, the methods of the prior art described hereinabove require means for preventing the threaded portion from being subjected to carburizing or means for tempering the threaded portion, thereby increasing cost.

SUMMARY OF THE INVENTION

This invention has been developed for the purpose of obviating the aforesaid disadvantages of the prior art. Accordingly, the invention has as its object the provision of a method of forming a screw thread on a crankshaft and the like which is simple in process steps and yet capable of forming a screw thread of high precision.

The outstanding characteristics of the invention enabling the aforesaid object to be accomplished includes the step of working on one portion of a crankshaft and the like to provide thereto a rod shape having a diameter of a value greater than the value of the diameter of the one portion before it is subjected to roll threading plus the value of the thickness of a hard, thin surface layer to be formed on the whole of the crankshaft and the like by carburizing, the step of carburizing the whole of the crankshaft and the like and the step of thread rolling the one portion of the crankshaft and the like after the hard, thin sufrace layer has been removed therefrom.

The screw thread formed on the crankshaft and the like by the method according to the invention is very high in precision and dimensional stability and free from variations in dimension which would occur when heat treatment is relied on for forming a screw thread. The method according to the invention eliminates the need to provide means for preventing the threaded portion of a crankshaft and the like from being carburized or means for tempering the threaded portion of a crankshaft and the like, so that the screw thread forming steps can be simplified and installations necessary for performing screw thread forming can be reduced in size and scale. When threading is performed by a double center arrangement, improved concentricity can be achieved between the crankshaft and the like and the grinder shaft.

BRIEF DESCRIPTION OF THE DRAWING

The single drawing is a side view of a crankshaft in explanation of the method for forming a screw thread by the method according to the invention.

DESCRIPTION OF THE PREFERRED EMBODIMENT

A preferred embodiment of the invention will be described by referring to the single drawing. A crankshaft 1, which is suitable for use with a small engine, for example, is formed of chromium-molybdenum steel as designated by JIS SCM21H, for example, and includes a threaded portion 2. As a preliminary step of the method according to the invention, one end portion of the crankshaft 1 corresponding to the threaded portion 2 is machined in such a manner that it is formed into a rod having a diameter of a value greater than the value of the diameter of the one end portion of the crankshaft 1 before it is subjected to roll threading plus the value of the thickness of a hard, thin surface layer to be provided by carburizing to the whole of the crankshaft 1. The thickness of the hard, thin surface layer to be provided by carburizing to the whole of the crankshaft 1 is, for example, in the range between 0.9 and 1.0 mm. Then, the crankshaft 1 is subjected to carburizing to form thereon the hard, thin surface layer of a surface hardness $H_{RC}$ of about 60 to 64, and the one end portion of the crankshaft 1 corresponding to the threaded portion 2 is machined to remove the hard, thin surface layer therefrom, to reduce the diameter of the one end portion of the crankshaft 1 to the level of the diameter of the one end portion before roll threading is performed thereon. The one end portion of the crankshaft 1 is subjected to roll threading to form thereon a screw thread to provide the threaded portion 2 of a desired diameter and a surface hardness $H_{RC}$, for example, in the range between 40 and 50.

What is claimed is:

1. A method of forming a screw thread by roll threading on one portion of a crankshaft and the like requiring carburizing to be performed thereon, comprising the steps of:
   preliminarily working on one portion of the shaft to provide thereto a diameter of a value greater than the value of the diameter of the one portion of the shaft before it is subjected to roll threading plus the value of the thickness of a hard, thin surface layer expected to be formed on the whole of the shaft by carburizing;
   subjecting the shaft to carburizing and hardening to form a hard, thin surface layer on the whole of the shaft said hard layer having a hardness of more than about 60 $H_{RC}$;
   removing by machining the hard, thin surface layer from the one portion of the shaft to reduce the diameter of the one portion of the shaft to a level conforming to the diameter thereof before roll threading is performed; and
   subjecting the one portion of the shaft from which the hard thin surface layer is removed to roll threading to provide the shaft with a threaded portion.

* * * * *